UNITED STATES PATENT OFFICE.

LEWIS DEITZ AND BENJAMIN P. WAYNE, OF ALBANY, NEW YORK.

IMPROVEMENT IN THE MANUFACTURE OF PYROXYLINE AND ARTICLES THEREFROM.

Specification forming part of Letters Patent No. 133,969, dated December 17, 1872.

*To all whom it may concern:*

Be it known that we, LEWIS DEITZ and BENJAMIN P. WAYNE, of Albany, in the county of Albany and State of New York, have invented certain Improvements in the Manufacture of articles from Pyroxyline and Material therefor, of which the following is a specification:

Our invention relates to a new material or fiber to be used in the manufacture of pyroxyline and articles therefrom. The fiber which we propose to employ is that which is obtained from a plant which is widely cultivated from India, through the Archipelago, to China, and is used in those countries for the manufacture of netting and cloth. The plant is now successfully cultivated in Louisiana, Texas, and California. This plant is known by several names, among which we find ramie, rheea, and China grass. Its proper botanical name is *Bochmeria nivea*. *B. tenacissima* is the same as *B. candicians*, and is only a sub-variety of *B. nivea*. The fiber of the *B. nivea* is prepared by the natives of India into hanks, which are separately twisted at their upper ends and tied into bundles of about half a pound weight. This fiber, when bleached and hackled, presents a very beautiful and silken appearance. It is also very strong, having about twelve times the strength of cotton.

We take the fiber of ramie (*B. nivea*) in this finely-divided and bleached state and subject it to substantially the same treatment that is required to convert cotton into pyroxyline. Pyroxyline thus made from ramie will always be of uniform solubility and strength, and works more evenly than pyroxyline made from cotton. In making collodion from this pyroxyline a much smaller quantity of the solvents is required than for pyroxyline made from cotton. For one pound of ramie we use about three pounds of ether and twelve fluid ounces of alcohol, or about twenty per cent. less than is required for the same quantity of cotton, and the result is that we obtain a mass more homogeneous in its nature, and which is worked with greater facility. By the addition of from two to ten per cent. of sandarach (dissolved) to the solution of ramie, and about fifteen per cent. of castor-oil, the collodion is rendered more elastic, and contracts or shrinks less when drying, which for many purposes is very desirable.

In the manufacture of billiard-balls, knife-handles, rules, and other imitations of ivory, we find this new pyroxyline of great value. It enables us to give them a most beautiful, durable, and perfect finish, excelling in many respects the ivory articles themselves.

These substances are intimately mixed within a revolving mill, and then evaporated to a pasty mass of about the consistency of dough. It is then molded into any desired form, dried, and seasoned in any suitable manner.

We color the pyroxyline by incorporating with it Paris zinc, English vermillion and carmine, rose lake and carmine, or any other desirable colors.

Ramie will give a much harder surface, and consequently it can be more highly finished, and is more durable, will have less friction, and is also possessed of greater strength.

Collodion made from ramie will admit of the incorporation with it of about twice the quantity of pigment, and we will still have a compound equal in strength, hardness, fineness, and other qualities to collodion made from cotton with one-half as much pigment in it.

The pyroxyline prepared from ramie is free from knots or undigested matter, and therefore requires no straining or similar manipulation previous to use.

When a sheet has been seasoned for about twenty-five days it may then be polished in the usual way of polishing ivory, and then pressed into any ornamental form or with any device in relief, or otherwise, as desired.

It will be seen from the above that many articles are made in whole, and others in part, of our new material. It may be molded, pressed, cut, turned, carved, or otherwise manipulated into such articles as billiard-balls, dental-plates, backs and handles of brushes, cameos, picture-frames, pencil and pen handles, keys for pianos, &c.; also for wind musical instruments, and various other articles, ornamental and useful.

What we claim as new and desire to secure by Letters Patent, is—

The pyroxyline made from the *Bochmeria nivea*, treated with the acids or equivalents, and by the process herein described.

LEWIS DEITZ.
BENJAMIN P. WAYNE.

Witnesses:
ISAIAH W. STEARNS,
THOS. HOUGHTON.